(12) United States Patent
Bekker et al.

(10) Patent No.: US 7,069,172 B2
(45) Date of Patent: Jun. 27, 2006

(54) METHOD AND APPARATUS FOR ACCURATE FAN TACHOMETER READINGS OF PWM FANS WITH DIFFERENT SPEEDS

(75) Inventors: Leonid A. Bekker, Holbrook, NY (US); Uri Segal, Farmingdale, NY (US)

(73) Assignee: Standard Microsystems Corporation, Hauppauge, NY (US)

(*) Notice: Subject to any disclaimer, the term of this patent is extended or adjusted under 35 U.S.C. 154(b) by 75 days.

(21) Appl. No.: 10/843,199

(22) Filed: May 11, 2004

(65) Prior Publication Data

US 2005/0256670 A1   Nov. 17, 2005

(51) Int. Cl.
  G01P 3/00 (2006.01)
  H02P 7/06 (2006.01)
(52) U.S. Cl. .................. 702/145; 318/599; 388/804
(58) Field of Classification Search ............... 702/106, 702/145; 318/599
See application file for complete search history.

(56) References Cited

U.S. PATENT DOCUMENTS

| | | |
|---|---|---|
| 4,722,669 A | 2/1988 | Kundert |
| 4,727,468 A | 2/1988 | Maekawa |
| 5,249,741 A | 10/1993 | Bistline et al. |
| 5,307,439 A | 4/1994 | Enami |
| 5,687,079 A | 11/1997 | Bauer et al. |
| 5,727,928 A | 3/1998 | Brown |
| 5,825,972 A | 10/1998 | Brown |
| 5,942,866 A | 8/1999 | Hsieh |
| 5,962,933 A | 10/1999 | Henderson et al. |
| 5,990,582 A | 11/1999 | Henderson et al. |
| 6,029,119 A | 2/2000 | Atkinson et al. |
| 6,182,902 B1 | 2/2001 | Shih |
| 6,188,189 B1 | 2/2001 | Blake |
| 6,208,538 B1 | 3/2001 | Halamik et al. |
| 6,226,324 B1 | 5/2001 | Allstrom |
| 6,247,898 B1 | 6/2001 | Henderson et al. |

(Continued)

OTHER PUBLICATIONS

"dBCOOL™ Remote Thermal Controller and Voltage Monitor", Analog Devices, ADM1027, 2003.

(Continued)

*Primary Examiner*—John Barlow
*Assistant Examiner*—Jonathan Moffat
(74) *Attorney, Agent, or Firm*—Meyertons Hood Kivlin Kowert & Goetzel, P.C.; Jeffrey C. Hood

(57) ABSTRACT

A system and method for generating a test signal used in measuring the speed of a rotating device, such as a fan in a computer system is disclosed. A pulse width modulated (PWM) signal may power the fan with the duty cycle of the PWM signal controlling the speed of the fan. The fan may generate tachometer pulses used for monitoring RPM of the fan. The frequency of the test signal may be selected to be at least twice the frequency of the tachometer pulses. The test signal may be generated from a base frequency signal using two cascaded frequency dividers. The first divider may output a scaled base frequency signal obtained by dividing the base frequency signal by a user programmable scale frequency coefficient corresponding to a maximum test signal frequency for the fan. The second divider may output the test signal by dividing the scaled base frequency signal by a fraction frequency coefficient obtained from and proportional to the current PWM duty cycle value. The test signal may be multiplexed with the PWM signal to obtain existing tachometer pulses even when the PWM signal is not asserted. The scale frequency coefficient may only need to be programmed once for each fan.

21 Claims, 5 Drawing Sheets

U.S. PATENT DOCUMENTS

| | | |
|---|---|---|
| 6,262,549 B1 | 7/2001 | Yang et al. |
| 6,519,167 B1 | 2/2003 | Nguyen |
| 6,526,333 B1 | 2/2003 | Henderson et al. |
| 6,528,987 B1 | 3/2003 | Blake et al. |
| 6,563,284 B1 | 5/2003 | Teutsch et al. |
| 6,601,168 B1 | 7/2003 | Stancil et al. |
| 6,617,815 B1 | 9/2003 | Krief |
| 6,650,074 B1 | 11/2003 | Vyssotski et al. |
| 6,661,679 B1 | 12/2003 | Yang et al. |
| 6,674,369 B1 | 1/2004 | Riddoch |
| 6,747,424 B1 | 6/2004 | Malik et al. |
| 6,757,592 B1 | 6/2004 | Henderson et al. |
| 6,765,422 B1 | 7/2004 | Aslan et al. |
| 6,778,938 B1 | 8/2004 | Ng et al. |
| 6,812,737 B1 | 11/2004 | Sueyoshi et al. |
| 2002/0197424 A1 | 12/2002 | Bayer et al. |
| 2003/0011332 A1 | 1/2003 | Mays |
| 2003/0137267 A1 | 7/2003 | Blake |
| 2003/0234630 A1 | 12/2003 | Blake |
| 2004/0001542 A1 | 1/2004 | Miller et al. |
| 2004/0027763 A1 | 2/2004 | Dhuey |

OTHER PUBLICATIONS

"Accurate Remote Diode Digital Temperature Sensor with Integrated Fan Control", LM63, National Semiconductor, 2003.

Stephen Ohr, "Analog IC Vendors Find 'Intel Inside' a Safe Bet", EETimes, http://www.eetimes.com/story/OEG20020912S0026 Sep. 12, 2002.

| PWM Duty Cycle % (8-bit value) | Fan Rotational Speed /Sec (RPS) | Tachometer Pulses Frequency (Hz) | Tachometer Pulse Width (50% Duty) mS | Min Sampling Frequency (MSF) Hz |
|---|---|---|---|---|
| 6% (16) | No rotation | - | | - |
| 9 % (24) | 10 | 20 | 25 | 40 |
| 12% (32) | 18 | 36 | 14 | 72 |
| 19% (48) | 28 | 56 | 9 | 112 |
| 25% (64) | 37 | 74 | 7 | 148 |
| 37% (96) | 50 | 100 | 5 | 200 |
| 50% (128) | 60 | 120 | 4 | 240 |
| 75% (192) | 74 | 148 | 3.4 | 296 |
| 100% (255) | 86 | 172 | 2.9 | 344 |

*Fig. 2*

METHOD AND APPARATUS FOR ACCURATE FAN TACHOMETER READINGS OF PWM FANS WITH DIFFERENT SPEEDS

BACKGROUND OF THE INVENTION

1. Field of the Invention

This invention relates to cooling equipment for electronic systems, e.g., fans, and more particularly, to measuring the rotational speed of a fan.

2. Description of the Related Art

Fans are often used to evacuate warm air from enclosures in which electronic systems are contained. For example, most computer systems include one or more cooling fans to aid in circulating the air inside the enclosures and for maintaining the temperature inside the enclosures within an acceptable range. The increased airflow provided by fans typically aids in eliminating waste heat that may otherwise build up and adversely affect system operation. Employing cooling fans is especially helpful in ensuring proper operation for certain central processing units (CPUs) with relatively high operating temperatures.

Control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected temperature. Such control algorithms may also involve turning off a fan if the temperature is deemed cool enough to do so.

Fans often include a tachometer output that provides a signal indicative of the current speed of the fan. The tachometer signal may be used to determine whether the fan is operating properly. Often, fans used for CPU and/or computer system cooling have a three-wire interface with wires for power, ground, and the tachometer signal. Fan drive systems often use a signal generator that provides a Pulse Width Modulated (PWM) signal to drive an external circuit that connects and disconnects the fan to and from ground. In such systems, the fan is typically powered only for the duration of the pulse. Between pulses power to the fan is turned off, though typically the fan continues spinning even during the time period between applications of PWM pulses. The duty cycle of the PWM pulse train being provided to the fan determines the fan's speed.

One issue associated with employing PWM signal generators to power fan circuits that typically incorporate three-wire fans is that the tachometer circuitry associated with the fans does not receive power during the time the fans themselves are not powered, that is, between the PWM pulses. In general, this issue may pose a problem whenever the method to power the fan circuits involves use of a non-continuous power supply, that is, when power is not continuously provided to the fan, e.g., a PWM signal generator. As a result, the tachometer signal output by the fan may not represent the current fan speed during the time between pulses. Similarly, once the fan is turned off, the tachometer signal no longer indicates the speed of the fan. One technique that is currently used to measure fan speed in these situations involves using an analog filtering system to measure the back Electromotive Force (EMF) inserted into the fan tachometer signal by the rotating fan. One digital technique used for measuring fan speed includes stretching the PWM signal pulse to insure that a valid tachometer signal remains asserted until the speed of the fan has been determined in case the duty cycle of the PWM signal would not permit such a measurement. There are, however, disadvantages associated with such techniques, including low accuracy, especially at low PWM duty cycles, fan speed surges resulting directly from stretching the PWM pulse and unwanted fan noise resulting from the fan speed surges. Another drawback is that the stretching typically dominates at low PWM duty cycles. In other words, the fan's speed, which is measured in revolutions-per-minute (RPM), is effectively controlled by the stretching of the PWM pulse and not by the duty cycle itself of the PWM signal. Such techniques generally lead to complicated implementations with significant impact on die size, and are typically prone to electrical noise sensitivity.

Many other problems and disadvantages of the prior art will become apparent to one skilled in the art after comparing such prior art with the present invention as described herein.

SUMMARY OF THE INVENTION

In one set of embodiments, the invention comprises a system and method for obtaining accurate fan tachometer readings for fans with different speeds. The fans may be breakable-ground-controlled fans in an electrical system. As referred to herein, a breakable-ground-controlled fan is a fan which may have its power terminal uninterruptedly tied to a supply voltage, while on/off switching of the fan is achieved through connecting/disconnecting the fan's ground terminal to/from ground. In one embodiment, the duty cycle of a PWM signal provided by a signal generator output controls the speed of the fan, while a tachometer reading-unit monitors the revolutions per minute (RPM) of the fan. Instead of driving the fan directly; the PWM signal may switch a fan driver circuit, which may provide adequate power to spin the fan. In alternate embodiments, the fan may be powered and controlled by means other than a PWM signal generator. In one embodiment, the fan generates a tachometer signal comprising tachometer pulses (also referred to as a fan pulses) that are used by the tachometer reading-unit to measure the RPM of the fan.

Low duty-cycle very low frequency test (VLFT) pulses may be generated and provided through a test or sampling signal multiplexed with the PWM signal to sample the fan generated tachometer pulses. The VLFT pulses of the test or sampling signal may operate to determine if the tachometer signal reaching the tachometer reading-unit is high or low. In one set of embodiments, the VLFT pulses ensure that tachometer pulses that may be generated by the fan are available even when there is no power provided to the fan by the power source used to control the fan. In one embodiment, as described in the previous paragraph, power is provided to the fan in form of PWM signal generator pulses, where the fan does not receive power from the PWM signal generator between the PWM pulses.

The VLFT pulses may be used for sampling to determine stages of the tachometer pulses, which may essentially facilitate "recreating" the tachometer pulses. Recreated tachometer pulses may have variable width since the fan and VLFT pulses of the test signal may for the most part be asynchronous with respect to each other, although the number of tachometer pulses for a period of time will be commensurate with the actual fan rotation, if the frequency of the VLFT pulses is at least twice the frequency of the tachometer pulses. In one embodiment, the frequency of the test or sampling signal (which comprises the VLFT pulses) is selected to be at least twice the highest attainable frequency of the fan generated tachometer pulses, per Nyquist's sampling theorem. In some embodiments the speed of the fan may not increase, though it may decrease, due to causes other than the PWM signal generator. In such embodiments the highest attainable frequency of the fan generated tachometer pulses may be reached when the PWM duty cycle is 100%, and the frequency of the test or sampling signal may also be adjusted as a function of the PWM duty cycle value, still observing Nyquist's sampling theorem.

The frequency of the test or sampling signal may be determined based on the duty cycle value of the PWM signal used to power the fan. In one embodiment, the frequency of the test or sampling signal is obtained through dividing a base frequency by a divider coefficient that corresponds to a particular PWM duty cycle value. The duty cycle values may be selected in advance; for example duty cycle values of 9%, 12%, 25%, 50%, 75%, and 100% may be used. Furthermore, the frequencies may be automatically selected using the high bits of the duty cycle of the PWM signal, which may be stored in a duty cycle value register. In one embodiment, selected PWM duty cycle values are converted by a decoder to corresponding frequency divider coefficient values. In order to account for a possible variation—from fan to fan—of the different frequencies corresponding to various PWM duty cycle values, the base frequency may first be divided to obtain a maximum frequency for the test or sampling signal corresponding to a specific fan. The thus obtained maximum frequency corresponding to a specific fan may then be used as a scaled base frequency that may be divided using the frequency divider coefficient values obtained from the conversion of the selected PWM duty cycles values.

In one embodiment, the tachometer reading-unit includes a flip-flop with the sampling signal providing the VLFT pulses used as the clock input of the flip-flop, and the tachometer signal providing the tachometer pulses used as the data input of the flip-flop, where the output of the flip-flop is the recreated fan rotational pulses, (or recreated tachometer pulses). The recreated tachometer pulses may be the input to a counter that is gated (turned on) for a specific time, with the output of the counter providing the measured RPM of the fan.

Thus, various embodiments of the systems and methods described above may facilitate design of a system that uses a test or sampling signal to accurately measure the speed of a fan in an electrical system while minimizing audio noise and sensitivity to electrical noise, and maintaining smooth fan operation, where only a maximum frequency for the test or sampling signal specific to the fan needs to be programmed for each fan.

BRIEF DESCRIPTION OF THE DRAWINGS

The foregoing, as well as other objects, features, and advantages of this invention may be more completely understood by reference to the following detailed description when read together with the accompanying drawings in which:

FIG. 2 illustrates a table showing a relationship between PWM duty cycle values and corresponding sampling signal frequencies;

Figure 1:
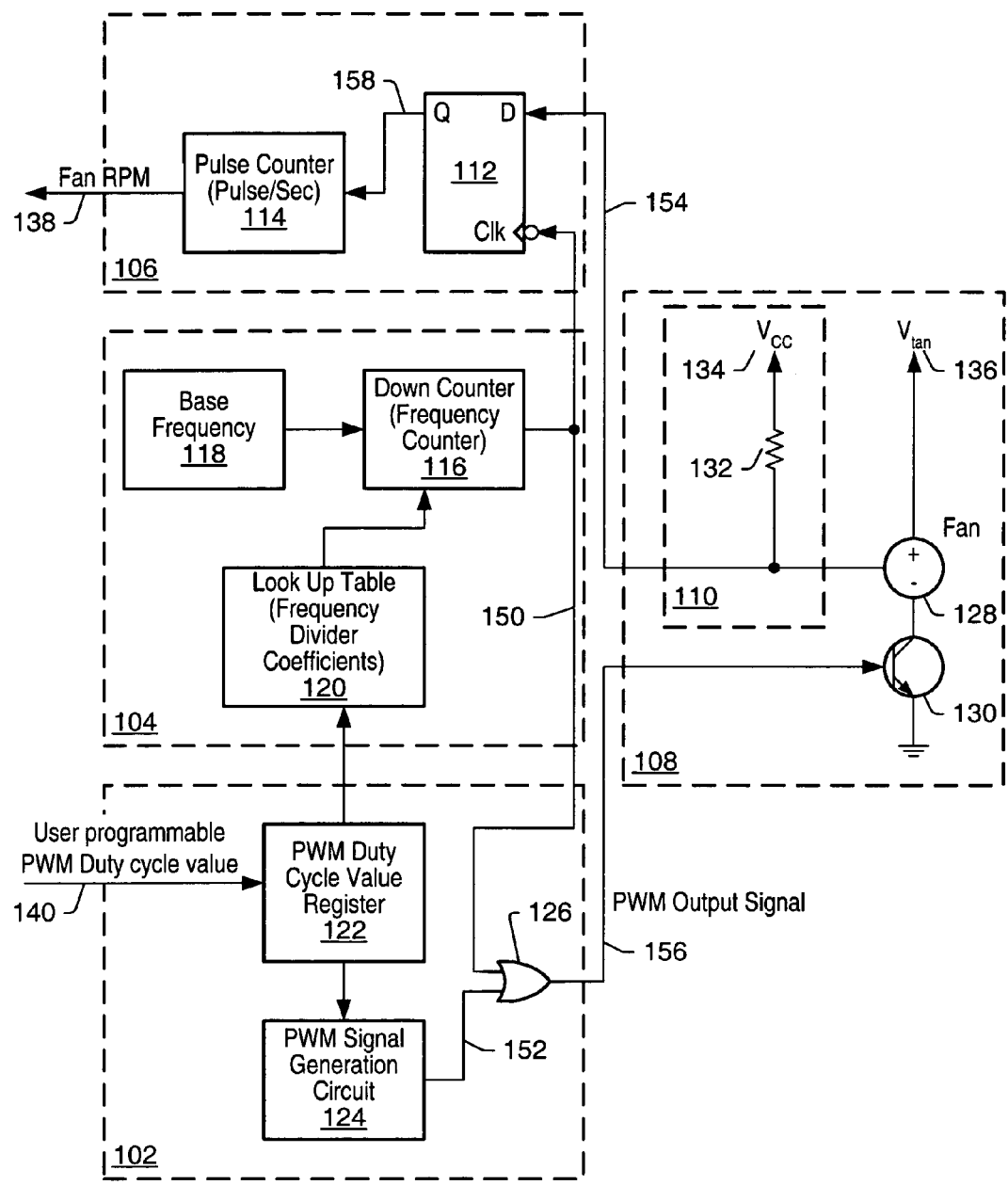
FIG. 1 illustrates one embodiment of a system to control the speed of a fan.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE PREFERRED EMBODIMENTS

As used herein, a "trigger" signal is defined as a signal that is used to initiate, or "trigger", an event or a sequence of events in a digital system. A trigger signal is said to be in a "triggering state" at a time when it initiates a desired event, or sequence of events. A periodic trigger signal may commonly be referred to as a "clock". In a "synchronous" digital system, generally a clock, commonly referred to as a "system clock", may be used for initiating most events, or sequences of events. An example of a triggering state may be, but is not limited to, a rising edge of a pulse of a clock in a synchronous digital system. A "frequency" of pulses refers to a number of pulses that may appear within a selected unit period of time. For example, if twenty pulses appear within duration of one second, then the frequency of the pulses is 20 Hz.

When an event, or a sequence of events, is said to be initiated "in response to" receiving a stimulus signal, it may be implied that the event, or the sequence of events, is initiated as a result of a combination of a trigger signal, used in triggering the event or sequence of events, being in a triggering state at a time when the stimulus signal is asserted. In one set of embodiments, the sending of a pulse through an output port may indicate a point in time at which a leading edge of the pulse occurs at the output port, and the receiving of a pulse through an input port may indicate a point in time at which a leading edge of the pulse occurs at the input port. As used herein, "setting" a device refers to setting an output of the device to a high logic level, whereas "resetting" a device refers to setting an output of the device to a low logic level. It will be evident to those skilled in the art that a high logic level may be physically represented by either a high voltage or a low voltage, and similarly a low logic level may be physically represented by either a low voltage or a high voltage.

When referencing a pulse of a signal, a "leading edge" of the pulse is a first edge of the pulse, resulting from the value of the signal changing from a default value, and a "trailing edge" is a second edge of the pulse, resulting from the value of the signal returning to the default value. When data is said to be "registered" or "latched" "using" a signal, the signal acts as a trigger signal that controls the storing of the data into the register or latch. In other words, when a signal "used" for registering or latching data is in its triggering state, the data residing at respective input ports of the register or latch is stored into the register or latch. Similarly, when data is latched "on the leading edge" or "on the trailing edge" of a pulse of a clock, the data residing at respective input ports of a register or latch is stored into the register or latch, respectively, when a leading edge or a trailing edge of a pulse of the clock occurs, respectively.

FIG. 1 illustrates one embodiment of a system to measure the speed (or RPM) of a fan 128. In this embodiment, the system includes a fan unit (FU) 108, a signal generator (SG) 102, a sampling circuit (SC) 104, and a tachometer reading-unit (TRU) 106. SC 104 may generate a sampling signal 150 which may be used by TRU 106 to count tachometer pulses generated by FU 108 and fed to TRU 106 through a tachometer signal 154. A sampling signal 150 may also be multiplexed with a PWM signal 152, which is generated by a PWM generation circuit 124 to control the speed of fan 128 that may be included in FU 108. In one embodiment, fan 128 is a 3-wire fan capable of generating tachometer pulses. In other embodiments other types of fans may be used, and tachometer pulses, or other signals, that are indicative of the speed of the fan may be obtained from the fans used. Sampling signal 150 and PWM signal 152 may be provided as inputs to an OR gate 126, the output of OR gate 126 providing a combined PWM output 156 to FU 108. Fan 128 may be coupled to a fan supply voltage 136 and to the collector of a transistor 130 that may also be included in FU 108, with PWM output 156 coupled to the base of transistor 130, in effect controlling on/off switching of transistor 130. When transistor 130 is operating in an "on" mode, fan 128 may provide a determined number of tachometer pulses per revolution of fan 128. The tachometer pulses may be sent as the data input to a flip-flop 112 via tachometer signal 154 that comprises the tachometer pulses. In some embodiments, a conditioning circuit 110 that may also be included in FU 108 may process tachometer signal 154 prior to tachometer signal 154 being provided to flip-flop 112. In one embodiment, conditioning circuit 110 may include a pull-up resistor 132 coupled to a system supply voltage 134, while in other embodiments, conditioning circuit 110 may include other elements in addition to or in place of pull-up resistor 132.

A user programmable PWM duty cycle value 140 for PWM signal 152 may be programmed into PWM value register 122. The value of the duty cycle may be provided by register 122 to PWM generation circuit 124, which will correspondingly adjust the duty cycle of PWM signal 152, which in turn will result in the speed of fan 128 being adjusted accordingly. For example, at a PWM duty cycle value of 100%, fan 128 may reach a maximum RPM value, while a PWM duty cycle value of 50% would lower the speed of fan 128 from the maximum RPM value. PWM value register 122 may also provide the currently programmed PWM duty cycle value to a lookup table 120. In one embodiment, lookup table 120 holds divider coefficient values, which are provided to a down counter (or frequency counter) 116 for generating sampling signal 150 based on a base frequency 118 provided to down counter 116.

The divider coefficients for a particular fan may be determined from empirical data for various selected PWM duty cycle values for the fan. In order to obtain the divider coefficients for the fan, a set of PWM duty cycle values may first be selected, and rotational speed of the fan (revolutions per second) may be measured using an optical tachometer. A frequency for the tachometer signal that comprises the tachometer pulses generated by the fan may thus be determined, since the fan will generate a pre-determined number of tachometer pulses per revolution. A minimum frequency for the sampling signal may be selected such that quantization of the sampling may be equal or higher than quantization of the tested asynchronous sequence (that is, quantization of the tachometer pulses generated by the fan). Furthermore, Nyquist's sampling theorem may be applied, and the frequency for the sampling signal may be selected to be at least twice the tachometer signal frequency that corresponds to the selected PWM duty cycle value. Note that this analysis may be performed for any fan, including fan 128, which may be selected from a variety of available fans. Some fans may generate more tachometer pulses per revolution than others.

In one embodiment, lookup table 120 holds a set of divider coefficients corresponding to respective PWM duty cycle values for fan 128, such that an appropriate frequency for sampling signal 150 may be generated from base frequency 118. In alternate embodiments, lookup table 120 may hold multiple sets of frequency divider coefficient values, each set of frequency divider coefficient values corresponding to a particular fan and to the set of PWM duty cycle values associated with the particular fan. The PWM duty cycle values may be selected based on what expected PWM duty cycle values might be programmed into register 122 during system operation. In a preferred embodiment, every time a new PWM duty cycle value is programmed into register 122, a corresponding divider coefficient is selected from lookup table 120 and provided to down counter 116, resulting in sampling signal 150 being generated at a frequency corresponding to the currently used PWM duty cycle.

Table 300 in FIG. 2 illustrates one set of possible PWM duty cycle values for PWM signal 152 and corresponding frequency values for sampling signal 150. In this example, fan 128 is a fast fan that generates 2 tachometer pulses per revolution and has an RPM of around 6000 at a PWM duty cycle value of 100%. Column 1 of table 300 includes the PWM duty cycle percentage values, and corresponding 8-bit binary values (shown in parentheses) assigned to the percentage values. The fan rotational speed (measured in revolutions per second) for each PWM duty cycle value is shown in column 2 of table 300, with a corresponding tachometer pulse frequency for each rotational speed value in column 3. For each tachometer frequency value a corresponding tachometer pulse width (at 50% duty cycle) measured in milliseconds is shown in column 4, with column 5 containing the minimum frequencies (in Hz) that are to be used when generating sampling signal 150 for the corresponding PWM duty cycle value. Note that the frequency values in column 5 are multiples of two of the corresponding frequency values in column 3, reflecting the use of Nyquist's sampling theorem when selecting the appropriate frequency for sampling signal 150. Other tables similar to table 300 may be created for different fans and different selections for the duty cycle values of PWM signal 152. It will be evident to those skilled in the art that this method is in no way limited to the values used in the example of table 300.

It should also be noted that an embodiment such as shown in FIG. 1 may also be used to obtain the divider coefficients for fan 128 by selecting the frequency of sampling signal 150 to be at least twice the frequency of tachometer signal 154 obtained at a PWM duty cycle of 100%. The thus selected frequency of sampling signal 150 will be sufficiently high to accurately measure the rotational speed of fan 128 for any selected PWM duty cycle value, and the individual minimum frequency of sampling signal 150 for each corresponding PWM duty cycle value may be determined using the frequency of tachometer signal 154 at the corresponding PWM duty cycle value, and Nyquist's sampling theorem as previously described.

In one embodiment, sampling signal 150 operates to obtain tachometer pulses from fan 128 even during time periods when PWM signal 152 might be unasserted. By multiplexing sampling signal 150 with PWM signal 152 using OR gate 126, and using the resultant output from OR gate 126 as PWM output 156 provided to FU 108, tachometer pulses may be obtained every time a pulse is present in sampling signal 150, provided that there is in fact a tachometer pulse present at the time of a pulse being present in sampling signal 150. By selecting the frequency of sampling signal 150 as previously described, all necessary tachometer pulses—of the appropriate width—may be recreated. This in turn may allow counting the tachometer pulses for a determined period of time, thus obtaining the RPM of fan 128.

The count may be achieved by using tachometer signal 154 as the data input into flip-flop 112 and clocking flip-flop 112 using sampling signal 150, which results in flip-flop 112 outputting recreated tachometer pulses via a recreated tachometer signal 158. The recreated tachometer pulses may then be provided to pulse counter 114, and the output of counter 114 will be fan RPM value 138. In some systems, fan RPM value 138 may be used as a feedback signal to determine if the speed of fan 128 needs to be altered, which may be accomplished by reprogramming PWM register 122 with an appropriate PWM duty cycle value as warranted by the current status of the system.

Figure 3:
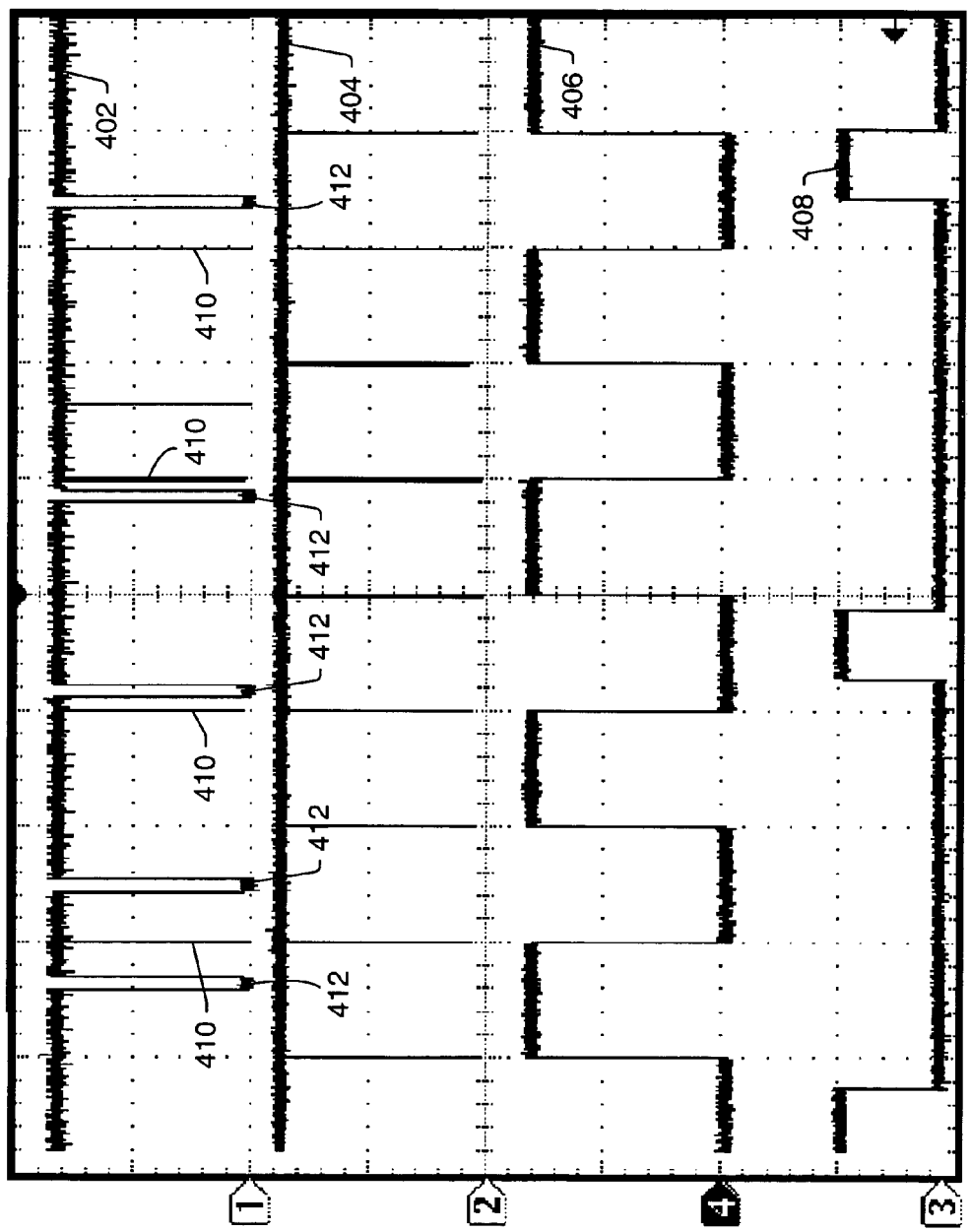
FIG. 3 illustrates a timing diagram of one example of a tachometer signal, a sampling signal, and a recreated tachometer signal, according to one embodiment of the present invention.

FIG. 3 illustrates a timing diagram of one example of tachometer signal 154, sampling signal 150, and recreated tachometer signal 158. In the example illustrated in FIG. 3, a PWM duty cycle of 12.5% is used, and fan 128 is assumed to generate 2 pulses per revolution. Waveform 402 represents tachometer signal 154, waveform 404 represents sampling signal 150, and waveform 406 represents recreated tachometer signal 158. As shown in FIG. 3, each pulse in waveform 404 samples the current value of waveform 402. This illustrates sampling signal 150 acting as the clock for flip-flop 112, with tachometer signal 154 provided as the data input of flip-flop 112. The output of flip-flop 112 represented by waveform 406 illustrates the recreated tachometer pulses present in recreated tachometer signal 158. As a result of applying sampling signal 150 to FU 108, additional pulses 410 appear in-between pulses 412 present during PWM signal 152 being asserted. Additional pulses 410 result in recreation of uninterrupted tachometer pulses shown in waveform 406, corresponding to the recreated tachometer pulses present in recreated tachometer signal 158. For a PWM duty cycle value higher than 12.5% the respective frequency of waveforms 402, 404, and 406 may also increase, and similarly for a PWM duty cycle value lower than 12.5%, the respective frequencies of waveforms 402, 404, and 406 may decrease. Waveform 408 shows an optical reference tachometer signal representing a single pulse per revolution, used as a base reference.

Figure 4:
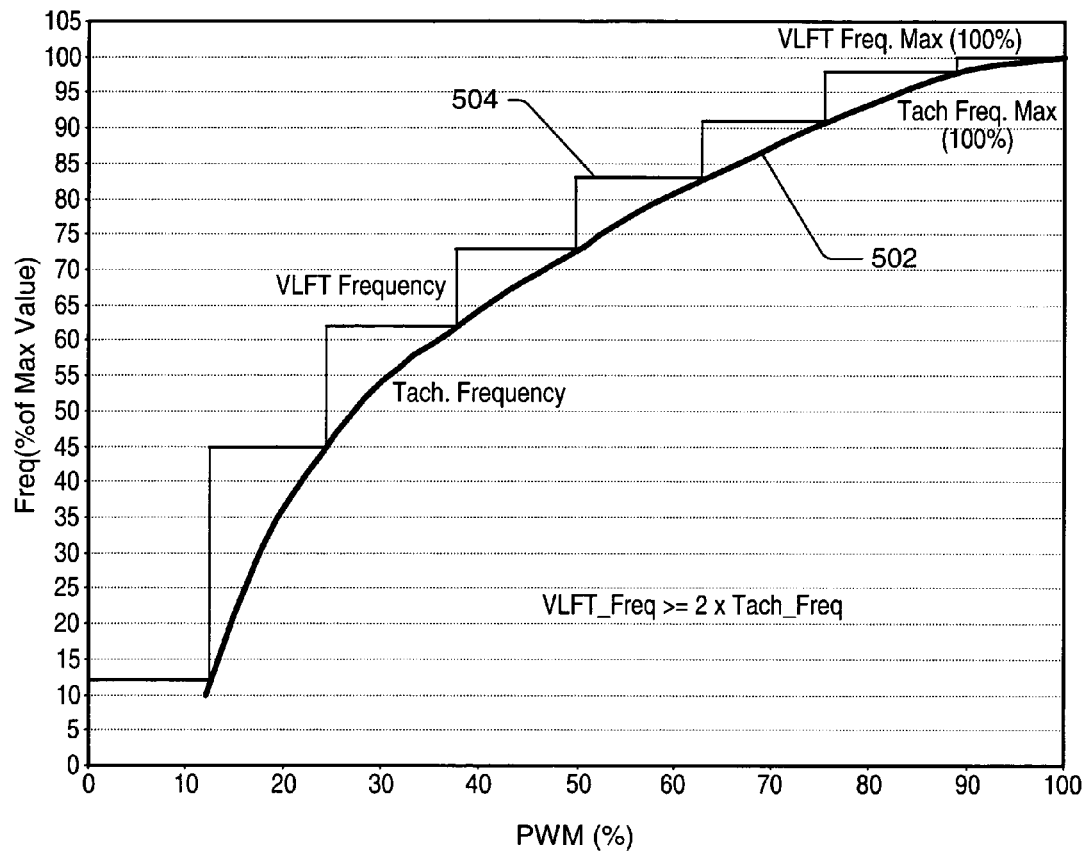
FIG. 4 illustrates a diagram of fan tachometer frequency as a function of PWM duty cycle percentage.

In one set of embodiments, a solution that may consume substantially less die area and does not feature a table that has to be programmed for each fan may be substituted for lookup table 120 (FIG. 1). When considering a variety of fans, a graph illustrating a functional relationship between fan tachometer frequency (as a percentage of the maximum tachometer frequency value) and PWM duty cycle value (given as a percentage value from 0 to 100) of a PWM signal generator powering the fan may be obtained for each fan. The tachometer frequency may be expressed as $$F_{Tach} = (RPM/60 \text{ sec}) * (\text{number of pulses per revolution}), \quad (1)$$

and may be plotted on the Y-axis of the graph vs. the PWM duty cycle plotted on the X-axis of the graph. It may be observed upon comparison of individual graphs thus obtained for a variety of fans that such graphs are substantially similar in shape and differ only in vertical scale, or, in other words, in the maximum tachometer frequency value (maximum RPM) associated with each fan. FIG. 4 illustrates a diagram of fan tachometer frequency as a function of PWM duty cycle percentage, representing a general relationship between tachometer frequency and PWM duty cycle for any fan.

Referring to FIG. 4, function curve 502 represents the fan tachometer frequency (expressed in terms of a percentage of the maximum tachometer frequency for a given fan) as a function of PWM duty cycle value, while step function curve 504 represents the corresponding VLFT frequency, or frequency of the sampling/test signal. As previously discussed, the VLFT frequency may be selected to be at least twice the tachometer frequency in order to meet Nyquist's sampling criterion. The graph of FIG. 4 may be used for obtaining VLFT frequency values from PWM duty cycle values for any fan, where only the actual value of the maximum VLFT frequency may differ for each fan. In other words, the scale of the VLFT frequency of one fan may differ from the scale of the VLFT frequency of another fan, while the functional relationship between the VLFT frequency and PWM duty cycle values may remain the same for all fans, as expressed by step function curve 504 in FIG. 4.

Based on the relationship between VLFT frequency and PWM duty cycle value obtained from FIG. 4, lookup tables 120 and 220 may each be replaced by a single logic unit, for example a decoder, for deriving frequency divider coefficients from corresponding PWM duty cycle values, where the same single logic unit may be used for controlling a variety of different fans. When employing the single logic unit only a single value, the maximum sampling/test signal frequency (maximum frequency of the VLFT pulses) corresponding to a respective fan, would need to be programmed.

Figure 5:
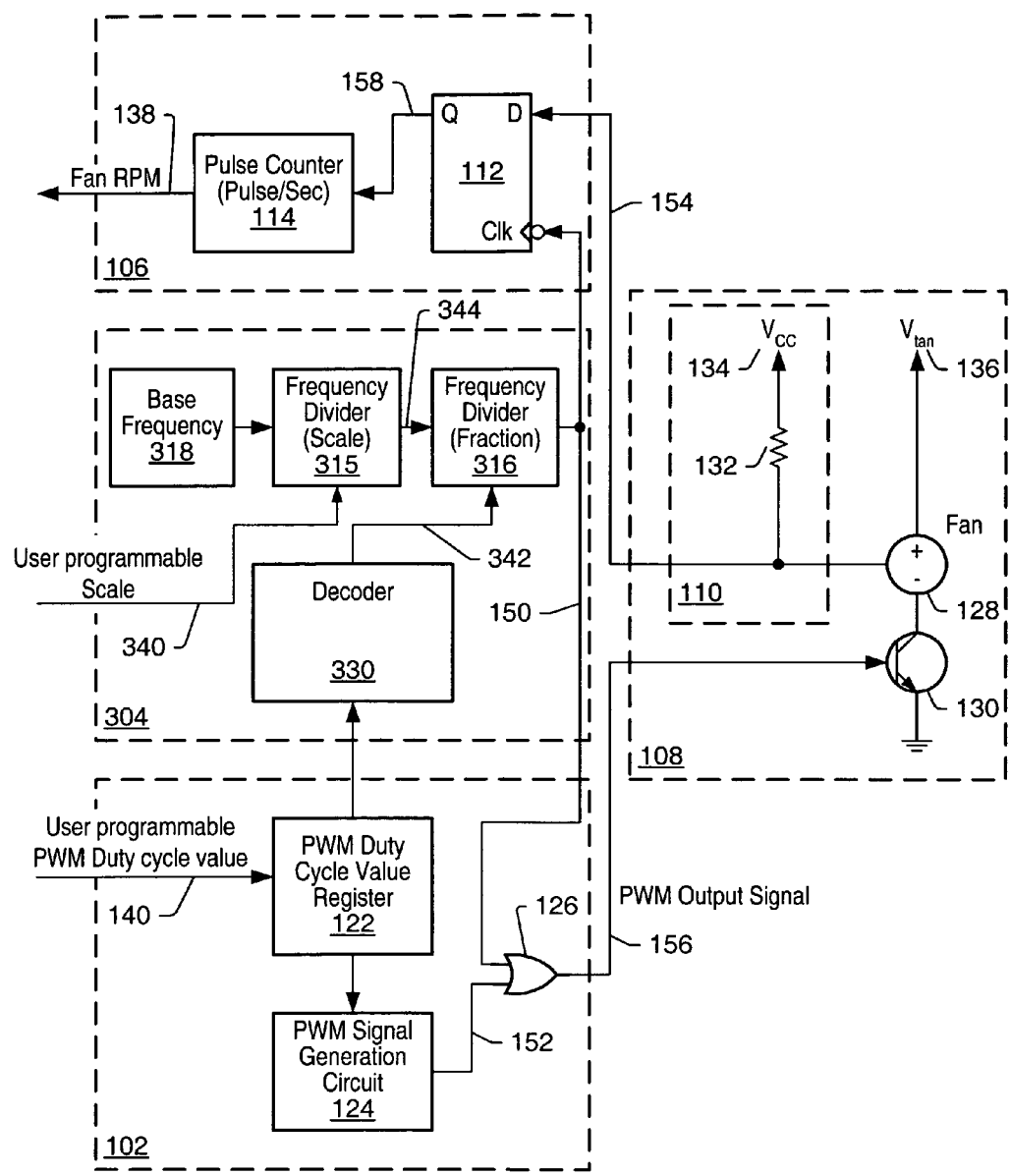
FIG. 5 illustrates one embodiment of a system to control the speed of a fan where the system includes a test/sampling signal generation circuit implemented in accordance with the present invention.

FIG. 5 illustrates the system of FIG. 1 with a uniform test/sampling signal generation unit (UTSG) 304 replacing SC 104. In one embodiment, UTSG 304 includes two chained frequency dividers (FD) 315 and 316. FD 315 may receive a base frequency (BF) 318 and a user programmable scale factor coefficient 340, which may be programmed for a particular fan and may result in FD 315 generating a scaled base frequency (SBF) 344 corresponding to a currently controlled fan. UTSG 304 may also include a decoder 330 that may receive a current PWM duty cycle value from PWM duty cycle value register 122, and provide a corresponding divider coefficient 342 to FD 316. In one embodiment, FD 315 provides the SBF 344 to FD 316, which generates sampling signal 150 based on SBF 344 and divider coefficient 342. While FIG. 5 illustrates one embodiment of a fan control circuit that utilizes UTSG 304 to generate sampling signal 150, alternate fan control circuits are also possible where signal 150 generated by UTSG 304 may be utilized to control other circuit elements while also providing power to the fan.

Selecting $X_1$ to represent scale factor coefficient 340, and $X_2$ to represent divider coefficient 342, the frequency of the VLFT pulses (comprised, for example, in sampling signal 150 in FIG. 5) may be expressed as:

$$F_{VLFT}=F_{base}/(X_1*(X_2+1)),$$

where $F_{base}$ represents the base frequency 318 as shown in FIG. 5. It should be noted that $X_1$ and $X_2$ may be selected such that $F_{VLFT}$ is at least twice the frequency of the tachometer signal in order to satisfy the Nyquist sampling criterion. Equation (2) may be rewritten as:

$$F_{VLFT}=(F_{base}/M*X_1)*(M/X_2+1), \quad (3)$$

where M represents a constant that corresponds to a lowest possible value of $X_2+1$, in other words, $(X_2+1) \geq M$. Establishing $X_2 \leq 1$, a maximum value of $F_{VLFT}$ may be obtained by setting $M=X_2+1$, resulting in:

$$F_{VLFT}=F_{base}/(M*X_1). \quad (4)$$

Based on equations (3) and (4), $X_1$ (that is, scale factor coefficient 340) may be programmed by the user such that $F_{VLFT} \geq 2*F_{Tach}$. Furthermore, $X_1$ may only need to be programmed once for the currently controlled fan. $X_2$ (divider coefficient 342) may be derived solely from the PWM duty cycle value (stored in register 122 in the system of FIG. 5) using decoder 330, and may be used for any currently controlled fan.

As an example, if $F_{base}$ is selected to be 90 kHz, and M is selected to be 16, and the maximum $F_{Tach}$ of the currently controlled fan is 200 Hz, then keeping with Nyquist's sampling theorem the value for the maximum frequency of the VLFT pulses may be written as $F_{VLFT\_MAX} \geq 400$ Hz. From equation (4) it follows that $X_1 \leq (90 \text{ kHz}/(16*400))$, and $F_{VLFT\_MAX}=401.7$ Hz for $X_1=14$. Referring to FIG. 4, for a value range of 12.5–25% of PWM, $F_{VLFT} \geq (0.45 * F_{VLFT\_MAX})$. From equation (3) it follows that $(M/(X_2+1)) \geq 0.45$, and $X_2=34$.

Thus, various embodiments of the systems and methods described above may facilitate design of a system that uses a test or sampling signal to accurately measure the speed of a rotating device, for example a fan in an electrical system, while minimizing audio noise and sensitivity to electrical noise, and maintaining smooth fan operation, where only a maximum frequency for the test or sampling signal specific to the currently controlled fan needs to be programmed for each fan.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A system for generating test signal pulses used in determining speed of a rotating device, wherein the rotating device is operable to generate a device signal indicative of the current speed of the rotating device, the system comprising:
    a first circuit operable to receive a first coefficient value corresponding to a maximum frequency of the test signal pulses and further operable to provide a scaled base frequency signal based on the first coefficient value;
    a second circuit operable to receive the scaled base frequency signal and a second coefficient value and further operable to generate the test signal pulses based on the scaled base frequency signal and the second coefficient value;
    wherein the scaled base frequency is commensurate with the maximum frequency of the test signal pulses;
    wherein a current frequency of the test signal pulses is proportional to a current frequency of the device signal; and
    wherein the test signal pulses operate to provide power to the rotating device.

2. The system of claim 1, wherein the rotating device is a fan comprised in an electrical system.

3. The system of claim 1, wherein a duty cycle of the current frequency of the test signal pulses is lower than 10%.

4. The system of claim 1, wherein the rotating device is a fan comprised in a computer system.

5. The system of claim 4;
    wherein the fan is powered by a PWM signal provided by a PWM signal generator; and
    wherein at least one respective test signal pulse of the test signal pulses is operable to power the fan when the respective test signal pulse is generated during a time when the PWM signal is not asserted, wherein the fan will remain powered for the duration of the respective test signal pulse.

6. The system of claim 5, further comprising:
    a third circuit configured to generate the second coefficient value as a function of a current duty cycle value of the PWM signal.

7. The system of claim 6, wherein the third circuit is a decoder whose input is configured to receive the current duty cycle value of the PWM signal.

8. The system of claim 1, wherein the current frequency of the test signal pulses is at least twice the current frequency of the device signal.

9. The system of claim 1; wherein the first circuit is a frequency divider and the second circuit is a frequency divider; and
    wherein the first coefficient value is a first frequency divider coefficient and the second coefficient value is a second frequency divider coefficient.

10. The system of claim 1, wherein the first circuit is operable to receive a base frequency signal and to provide the scaled base frequency signal based on the first coefficient value and the base frequency signal.

11. The system of claim 1, wherein the first coefficient value is user programmable.

12. The system of claim 11, wherein the first coefficient value is programmed once and corresponds to the rotating device.

13. A system for generating test signal pulses used in determining speed of a fan in a computer system, wherein the fan is operable to generate a tachometer signal indicative of the current speed of the fan, the system comprising:
    a first circuit operable to receive a first coefficient value corresponding to a maximum frequency of the test signal pulses and further operable to provide a scaled base frequency signal based on the first coefficient value;
    a second circuit operable to receive the scaled base frequency signal and a second coefficient value and further operable to generate the test signal pulses based on the scaled base frequency signal and the second coefficient value;
    wherein the scaled base frequency is commensurate with the maximum frequency of the test signal pulses;

wherein a current frequency of the test signal pulses is proportional to a current frequency of the tachometer signal; and wherein the test signal pulses operate to provide power to the fan.

14. The system of claim 13;

wherein the fan is powered by a PWM signal provided by a PWM signal generator; and wherein at least one respective test signal pulse of the test signal pulses is operable to power the fan when the respective test signal pulse is generated during a time when the PWM signal is not asserted, wherein the fan will remain powered for the duration of the respective test signal pulse.

15. The system of claim 14, further comprising:

a third circuit configured to generate the second coefficient value as a function of a current duty cycle value of the PWM signal.

16. The system of claim 15, wherein the third circuit is a decoder whose input is configured to receive the current duty cycle value of the PWM signal.

17. The system of claim 13;

wherein the first circuit is a frequency divider and the second circuit is a frequency divider; and wherein the first coefficient value is a first frequency divider coefficient and the second coefficient value is a second frequency divider coefficient.

18. The system of claim 13, wherein the first coefficient value is user programmable.

19. The system of claim 18, wherein the first coefficient value is programmed once and corresponds to the fan.

20. A method for generating a test signal used in determining speed of a rotating device, wherein the rotating device is operable to generate a device signal indicative of the current speed of the rotating device, the method comprising:

generating a base frequency signal;

obtaining a scaled base frequency signal from the base frequency signal, wherein the scaled base frequency is the base frequency divided by a scale coefficient;

obtaining the test signal from the scaled base frequency signal, wherein a current frequency of the test signal is the scaled base frequency divided by a fraction coefficient;

wherein the scaled base frequency is commensurate with a maximum frequency of the test signal;

wherein the current frequency of the test signal is proportional to a current frequency of the device signal; and wherein the test signal operates to provide power to the rotating device.

21. A method for generating a test signal used in determining speed of a fan in a computer system, wherein the fan is powered by a PWM signal, and wherein the fan is operable to generate a tachometer signal indicative of the current speed of the fan, the method comprising:

generating a base frequency signal;

obtaining a scaled base frequency signal from the base frequency signal, wherein the scaled base frequency is the base frequency divided by a scale coefficient;

obtaining, the test signal from the scaled base frequency signal, wherein a current frequency of the test signal is the scaled base frequency divided by a fraction coefficient;

wherein the scaled base frequency is commensurate with a maximum frequency of the test signal;

wherein the current frequency of the test signal is proportional to a current frequency of the tachometer signal; and wherein at least one respective test signal pulse of the test signal is operable to power the fan when the respective test signal pulse is generated during a time when the PWM signal is not asserted, wherein the fan will remain powered for the duration of the respective test signal pulse.

* * * * *